(12) United States Patent
Chen et al.

(10) Patent No.: US 10,231,214 B2
(45) Date of Patent: Mar. 12, 2019

(54) RESOURCE INDICATION FOR LINK AGGREGATION IN A WIRELESS NETWORK

(71) Applicant: Intel IP Corporation, Santa Clara, CA (US)

(72) Inventors: Xiaogang Chen, Portland, OR (US); Laurent Cariou, Portland, OR (US); Po-Kai Huang, San Jose, CA (US); Qinghua Li, San Ramon, CA (US); Robert Stacey, Portland, OR (US)

(73) Assignee: Intel IP Corportion, Santa Clara, CA (US)

( * ) Notice: Subject to any disclaimer, the term of this patent is extended or adjusted under 35 U.S.C. 154(b) by 175 days.

(21) Appl. No.: 15/472,920

(22) Filed: Mar. 29, 2017

(65) Prior Publication Data
US 2018/0288742 A1   Oct. 4, 2018

(51) Int. Cl.
*H04W 16/14*   (2009.01)
*H04W 72/04*   (2009.01)
*H04W 84/12*   (2009.01)

(52) U.S. Cl.
CPC .......... *H04W 72/04* (2013.01); *H04W 16/14* (2013.01); *H04W 84/12* (2013.01)

(58) Field of Classification Search
CPC ..................................................... H04W 72/04
See application file for complete search history.

(56) References Cited

U.S. PATENT DOCUMENTS

| | | | |
|---|---|---|---|
| 9,338,789 B2 * | 5/2016 | Wang | H04W 72/0413 |
| 10,123,330 B2 * | 11/2018 | Josiam | H04W 72/0453 |
| 2016/0100396 A1 * | 4/2016 | Seok | H04L 5/003 370/329 |
| 2017/0303208 A1 * | 10/2017 | Suh | H04W 52/346 |

* cited by examiner

*Primary Examiner* — Shripal K Khajuria
(74) *Attorney, Agent, or Firm* — Patent Capital Group

(57) ABSTRACT

A legacy WiFi communication may contain information to permit a receiver to know of the presence of a parallel new band (NB) communication, and to receive that information in time to know how to receive the NB communication. In various embodiments, this information may be contained in the L-SIG, RL-SIG, and/or HE-SIG-A subfields of a single user PPDU, or in the L-SIG, RL-SIG, HE-SIG-A, and/or HE-SIG-B subfields of a multi-user PPDU.

22 Claims, 6 Drawing Sheets

| 8μs | 8μs | 4μs | 4μs | 8μs | 4μs | Variable durations per HE-LTF symbol |  |  |
|---|---|---|---|---|---|---|---|---|
| L-STF | L-LTF | L-SIG | RL-SIG | HE-SIG-A | HE-STF | HE-LTF ... HE-LTF | DATA | PE |

HE SU PPDU format

FIG. 5

| 8μs | 8μs | 4μs | 4μs | 8μs | 4μs per symbol | 4μs | Variable durations per HE-LTF symbol |  |  |
|---|---|---|---|---|---|---|---|---|---|
| L-STF | L-LTF | L-SIG | RL-SIG | HE-SIG-A | HE-SIG-B | HE-STF | HE-LTF ... HE-LTF | DATA | PE |

HE MU PPDU format

FIG. 6

RESOURCE INDICATION FOR LINK AGGREGATION IN A WIRELESS NETWORK

TECHNICAL FIELD

Various embodiments of the invention may pertain to the field of wireless communication. In particular, various protocols may be described for how to organize information that is communicated.

BACKGROUND

As existing unlicensed wireless communications bands become congested (for example, those bands around 5 GHz), additional bands around 3.5 GHz, not previously allocated for unlicensed use (e.g., new bands), may be opened by the communications regulatory agencies for such use. However, the lower frequencies may make it unfeasible or impractical to continue with the 20 MHz (and multiples of 20 MHz) bandwidths that have become common, especially for those devices that conform to various communications standards, such as but not limited to IEEE 802.11ax version D1.0 published November 2016. Narrower bandwidths, such as 10 MHz, are feasible but cannot be mapped directly into the 20 MHz format without sacrificing throughput, and might have to operate as a separate radio from devices that use the legacy 20 MHz bandwidth. This might require the 20 MHz bandwidth (and multiples thereof) channels and the 10 MHz bandwidth (and multiples thereof) channels to operate independently of each other, possibly eliminating any chance for them to operate in an integrated manner. This would greatly complicate those networks that have both legacy channels using bandwidths that are multiples of 20 MHz and newer channels using bandwidths that are multiples of 10 MHz.

BRIEF DESCRIPTION OF THE DRAWINGS

Some embodiments of the invention may be better understood by referring to the following description and accompanying drawings that are used to illustrate embodiments of the invention. In the drawings:

FIG. 5 shows a format for a High Efficiency Single User PPDU (HE-SU-PPDU) containing an HE-SIG-A field.

FIG. 6 shows a format for a High Efficiency Multi User PPDU (HE-MU-PPDU) containing an HE-SIG-A field and an HE-SIG-B field.

DETAILED DESCRIPTION

Figure 1:
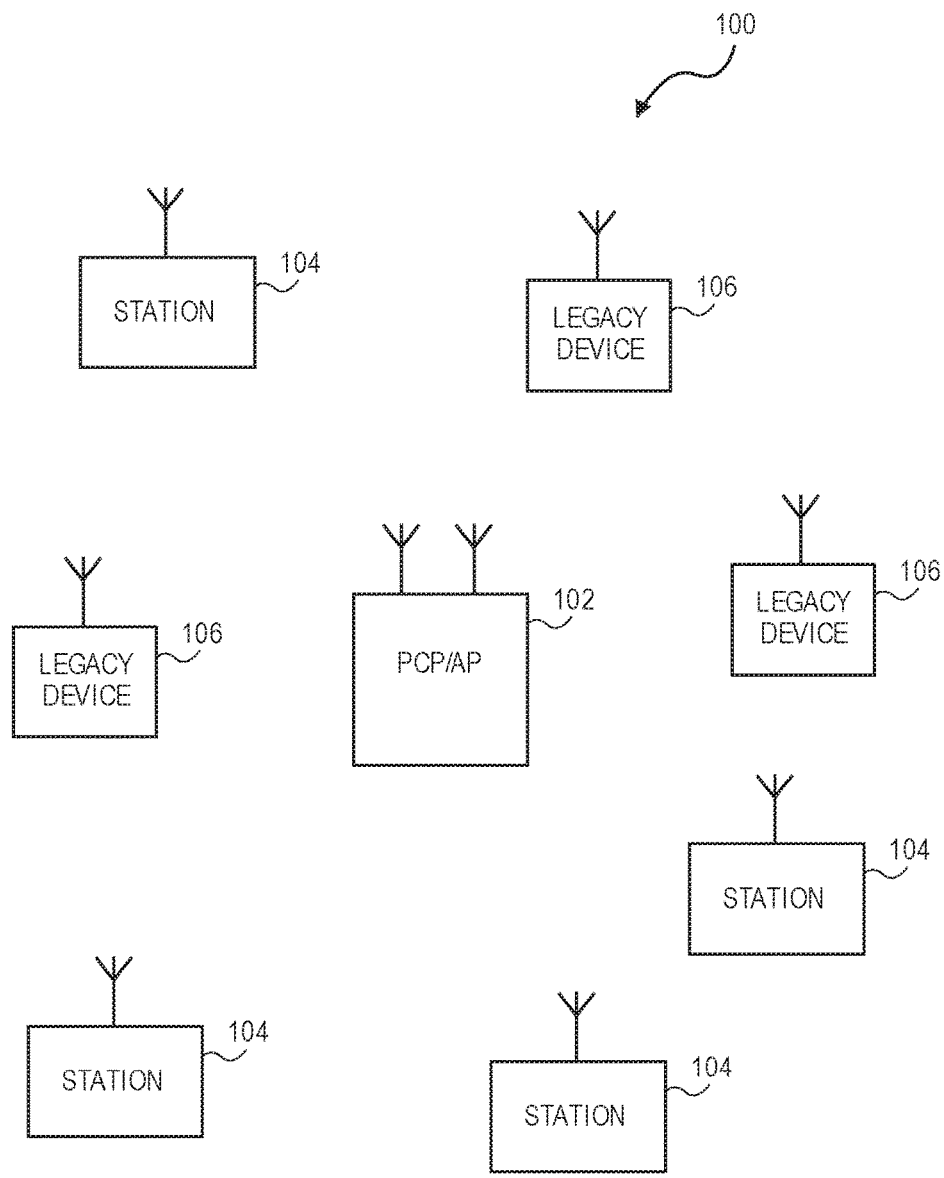
FIG. 1 shows a wireless network 100, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Various embodiments of the invention may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

The term "wireless" may be used to describe circuits, devices, systems, methods, techniques, communications channels, etc., that communicate data by using modulated electromagnetic radiation through a non-solid medium. A wireless device may comprise at least one antenna, at least one radio, at least one memory, and at least one processor, where the radio(s) transmits signals through the antenna that represent data and receives signals through the antenna that represent data, while the processor(s) may process the data to be transmitted and the data that has been received. The processor(s) may also process other data which is neither transmitted nor received.

As used within this document, the term "network controller" is intended to cover devices that schedule and control, at least partially, wireless communications by other devices in the network. A network controller may also be known as a base station (BS), access point (AP), central point (CP), PBSS Control Point (PCP) or any other term that may arise to describe the functionality of a network controller.

As used within this document, the term "mobile device" is intended to cover those devices whose wireless communications are at least partially scheduled and controlled by the network controller. A mobile device (MD) may also be known as a mobile station (MS), STA, subscriber station (SS), user equipment (UE), or any other term that may arise to describe the functionality of a mobile device. Mobile devices may move during such communications, but movement is not required.

As used within this document, the term "legacy device" is used to cover mobile devices whose operation conforms to protocols and operational procedures that were developed for previous versions of networks, before the embodiments described herein were defined.

As used within this document, the term "communicate" is intended to include transmitting and/or receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as 'communicating', when only the functionality of one of those devices is being claimed.

FIG. 1 shows a wireless network 100, according to an embodiment of the invention. Devices and stations 102, 104, and 106 may each be considered a wireless communication device. The WLAN may comprise a basis service set (BSS) or personal BSS (PBSS) 100 that may include a network controller 102, which may be an AP/PCP, a plurality of wireless (e.g., IEEE 802.11ax) STAs 104 and a plurality of legacy (e.g., IEEE 802.11n/ac/ad) STAs 106.

The network controller 102 may be an AP to provide overall network control of WLAN 100. The network controller 102 may use other communications protocols as well as the IEEE 802.11 protocol. In some embodiments, the IEEE 802.11 protocol may be IEEE 802.11ax version D1.0, published November 2016. The IEEE 802.11 protocol may include using orthogonal frequency division multiple-access (OFDMA), time division multiple access (TDMA), and/or code division multiple access (CDMA). The IEEE 802.11 protocol may include one or more multiple access techniques. For example, the IEEE 802.11 protocol may include space-division multiple access (SDMA), multiple-input multiple-output (MIMO), multi-user MIMO (MU-MIMO), and/or single-input single-output (SISO). The network controller 102 and/or wireless STA 104 may be configured to operate in accordance with NG60, WiGiG, and/or IEEE 802.11ay.

The legacy devices 106 may operate in accordance with one or more of IEEE 802.11 a/b/g/n/ac/ad/af/ah/aj, or another legacy wireless communication standard. The legacy devices 106 may be STAs. The wireless STAs 104 may be wireless transmit and receive devices such as cellular telephone, smart telephone, handheld wireless device, wireless glasses, wireless watch, wireless personal device, tablet, or another device that may be transmitting and receiving using one of the IEEE 802.11 protocols, such as IEEE 802.11ax. The STAs 104 and/or network controller 102 may be attached to a BSS and may also operate in accordance with IEEE 802.11ax where one of the STAs 104 and/or network controller 102 takes the role of the PCP.

The network controller 102 may be equipped with more than one antenna. Each of the antennas of network controller 102 may be a phased array antenna with multiple elements.

Figure 2:
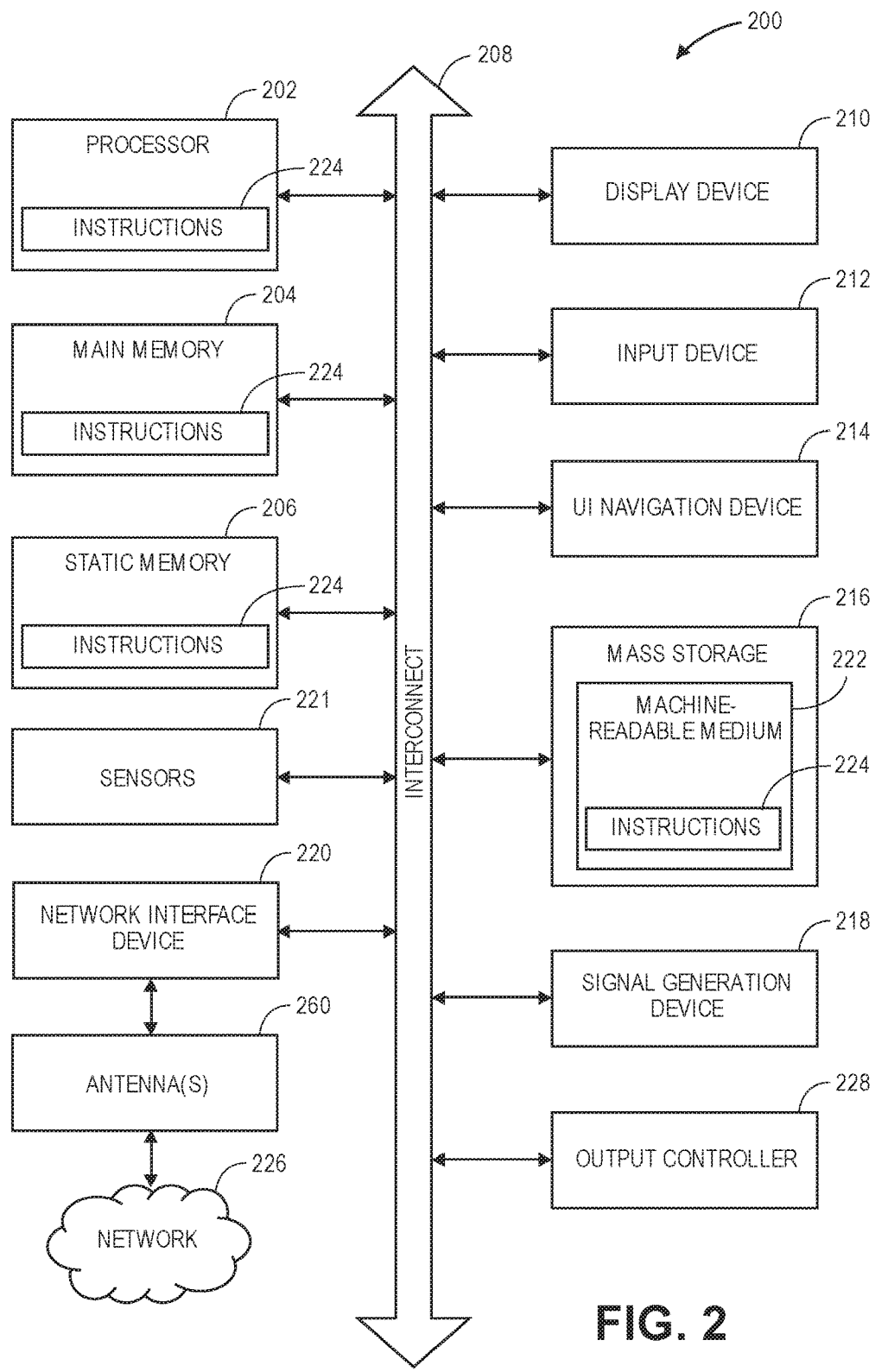
FIG. 2 shows a wireless communications device 200, according to an embodiment of the invention.

FIG. 2 shows a wireless communications device 200, according to an embodiment of the invention. Device 200 may represent any of devices 102, 104, or 106 shown in FIG. 1. The elements of device 200 are shown as an example, but other wireless devices may have more, fewer, or different features. Device 200 is shown with one or more antennas 211, one or more radios 260, one or more processors 202, one or more memories 204 and/or 206, and other components. These components may be coupled together in any feasible manner.

Figure 3:
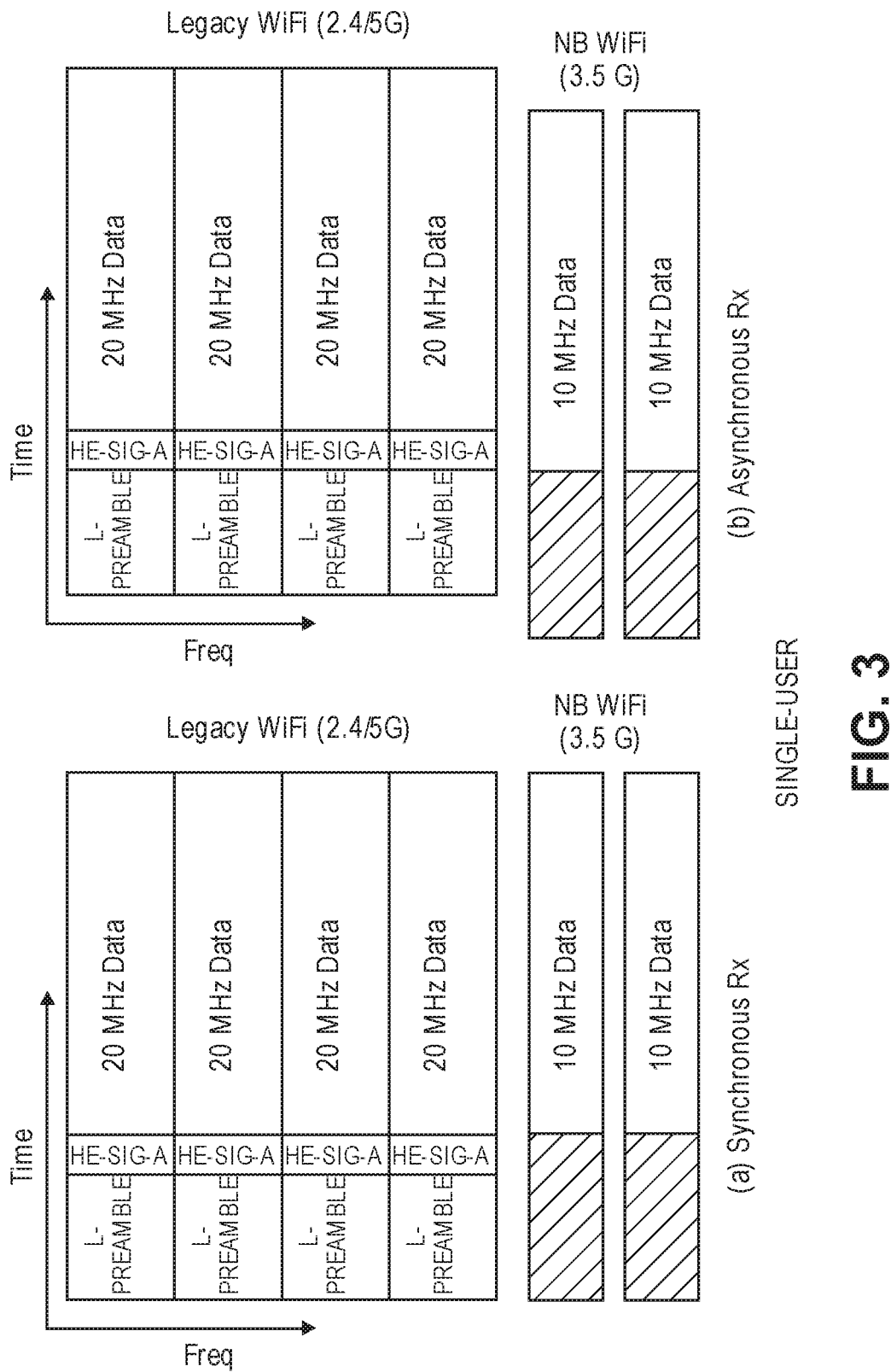
FIG. 3 shows a timing diagram of legacy and new band channels, according to a single-user embodiment of the invention.

FIG. 3 shows a timing diagram of legacy WiFi channels in the 2.4 or 5 GHz frequency bands, and narrow band (NB) WiFi channels in the 3.5 GHz frequency band, according to a single-user embodiment of the invention. Within this document, the term 'narrow band', or NB, shall refer to bandwidths of 10 MHz or multiples of 10 MHz, and the channels that use those bandwidths for communication around the 3.5 GHz frequency band. FIG. 3 is labeled to show what is received by the receiving device (as indicated by the term Rx near the bottom), but of course the same signals may also be transmitted by the transmitting device. The legacy channels are shown with a bandwidth of 20 MHZ (or multiples of 20 MHz). The NB channel is shown with a bandwidth of 10 MHz (or multiples of 10 MHz). The segment of those channels labeled '20 MHz Data' and '10 MHz Data' represents the data to be received, decoded, and interpreted correctly by the receiver, and information on how to do so should be received before the data begins. For the legacy channels, the relevant information may already be included in the transmission prior to the data segment, according to established protocols. But in various embodiments of the invention, this information for the NB WiFi channel may be included in the 20 MHz channels, along with information on whether any NB WiFi channel is even present. By necessity, the receiving device must receive this information concerning the NB WiFi channel data, and whether the NB WiFi channel is even present, before that data starts to be received. This can put some timing constraints on when this interpretation information is to be received. These constraints, in turn, may limit where the information may be included.

In one embodiment, the information for whether the 10 MHz channel is present, and its bandwidth, may be contained in an HE-SIG-A field of the transmission of a 20 MHz channel. This is shown after the legacy preamble but before the 20 MHz data. This information may be duplicated on each 20 MHz channel. As seen in FIG. 3(a), for synchronous reception (i.e., the 10 MHz data begins at the same time as the 20 MHz data), this timing allows the receiver to receive the HE-SIG-A field before the 10 MHz data starts, and the receiver may therefore know how to decode the 10 MHz data. However, as seen in FIG. 3(b) for asynchronous reception (e.g., if the 10 MHz data begins before the start of the 20 MHz data), the receiver may not receive the HE-SIG-A field in time, and may therefore not know how to interpret the 10 MHz data. To overcome this problem, other techniques may be used, which are discussed further below.

Figure 4:
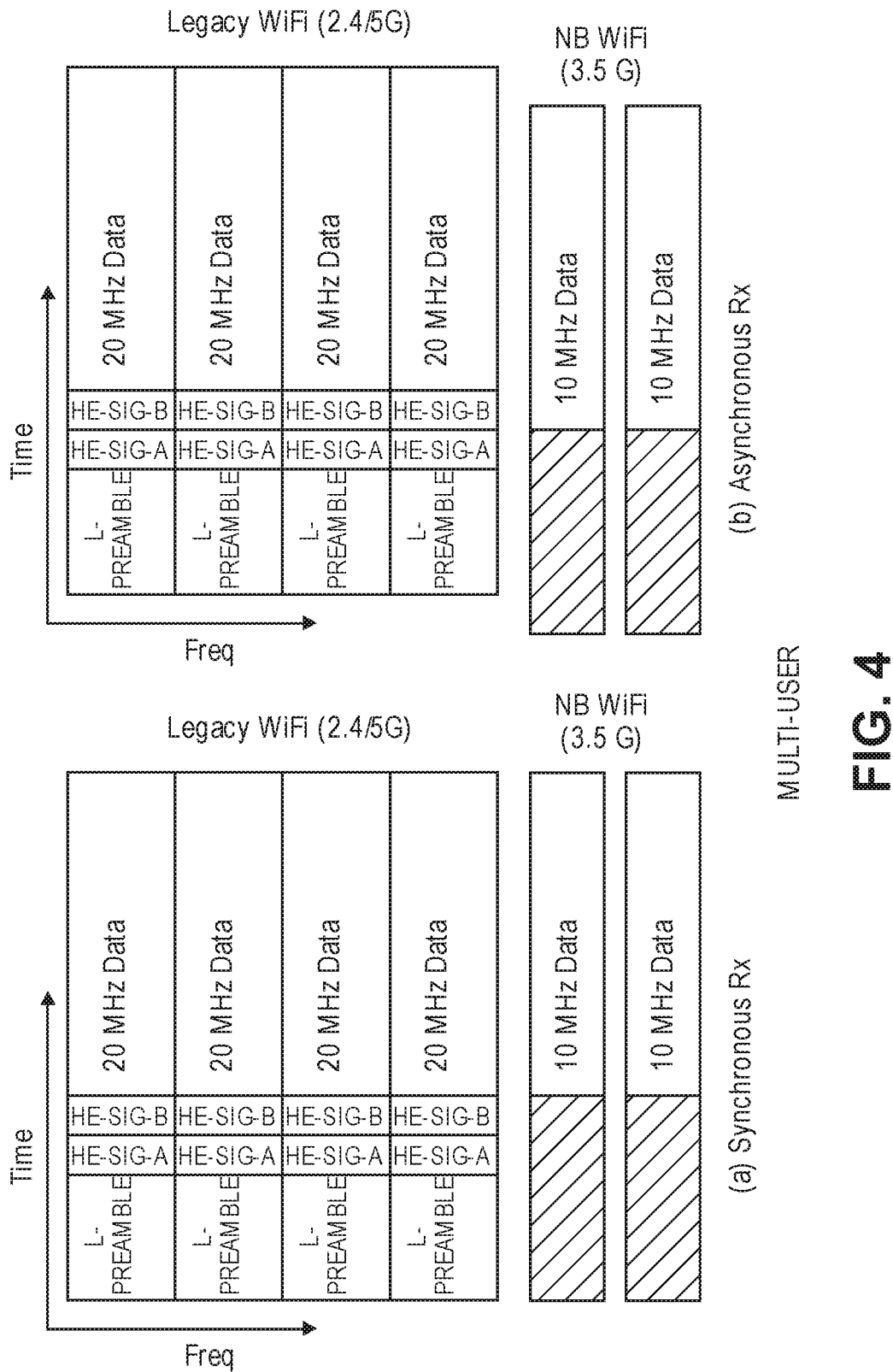
FIG. 4 shows a timing diagram of legacy and new band channels, according to a multi-user embodiment of the invention.

FIG. 4 shows a timing diagram of legacy WiFi channels in the 2.4 or 5 GHz frequency bands, and new band (NB) WiFi channel in the 3.5 GHz frequency band, according to a multi-user embodiment of the invention. This embodiment operates similarly to that of FIG. 3, except that both HE-SIG-A and HE-SIG-B fields are placed between the legacy preamble and the 20 MHz data. The addition of the HE-SIG-B field permits an additional location where the interpretation data may be included in the legacy communication.

FIG. 5 shows a format for a High Efficiency Single User Physical layer Protocol Data Unit (HE-SU-PPDU) containing an HE-SIG-A field. The HE-SIG-A field shown here may be the HE-SIG-A fields shown in FIGS. 3(a) and 3(b). The remainder of FIG. 5, with the exception of HE-SIG-A, is not indicated in FIG. 3 to avoid clutter. However, FIG. 3 shows the approximate location of HE-SIG-A in the larger signal stream. A single bit in HE-SIG-A might be used to indicate whether or not the NB channel is being presented, as shown in FIGS. 3 and 4. Within draft 1.0 of IEEE 802.111ax, bit B14 of HE-SIG-A1 and HE-SIG-A2 were reserved and may be used for this purpose in single user (SU) operations. In multi user (MU) operations, bit B7 of HE-SIG-A2 was also reserved in that standard and may be used for this purpose. Alternately, one of the bits previous defined in the standard, or another bit to be defined in a later standard, may be redefined for this purpose.

In an alternative embodiment, the L-SIG and RL-SIG fields shown in FIG. 5 may be used to indicate the presence of the NB channel. The constellation in the L-SIG field may be rotated in a certain direction (polarity). The constellation in the repeated L-SIG (RL-SIG) field may also be rotated with a certain polarity. If the polarity of both constellations are the same as each other, this may indicate the absence of the NB channel, while if the polarity of both constellations are the opposite of each other, this may indicate the presence of the NB channel. The opposite convention (same polarity=presence, opposite rotation=absence) may also be used. Since the L-SIG and RL-SIG fields are shown in both FIG. 5 and FIG. 6, this convention may be used to indicate the presence of NB channel for either single or multi-user operations. Also in FIGS. 5 and 6, L-SIG and RL-SIG are shown coming before HE-SIG-A, so using them rather than HE-SIG-A may provide a timing advantage for signaling the presence of the NB channel.

FIG. 6 shows a format for a High Efficiency Multi User PPDU (HE-MU-PPDU) containing an HE-SIG-A field and an HE-SIG-B field. The HE-SIG-B field shown here may be the HE-SIG-B fields shown in FIGS. 4(a) and 4(b). The remainder of FIG. 6, with the exception of HE-SIG-A and HE-SIG-B, is not indicated in FIG. 4 to avoid clutter. However, FIG. 4 shows the approximate location of the HE-SIG-B in the larger signal stream.

The HE-SIG-B field may be included for multi-user operations. Since the presence or absence of the NB channel may have already been indicated in the HE-SIG-A field, this information need not be repeated in the HE-SIG-B field. However, the bits indicating the frequency may be indicated in HE-SIG-B, since there are multiple channels to describe that could not be described in HE-SIG-A.

Figure 7:
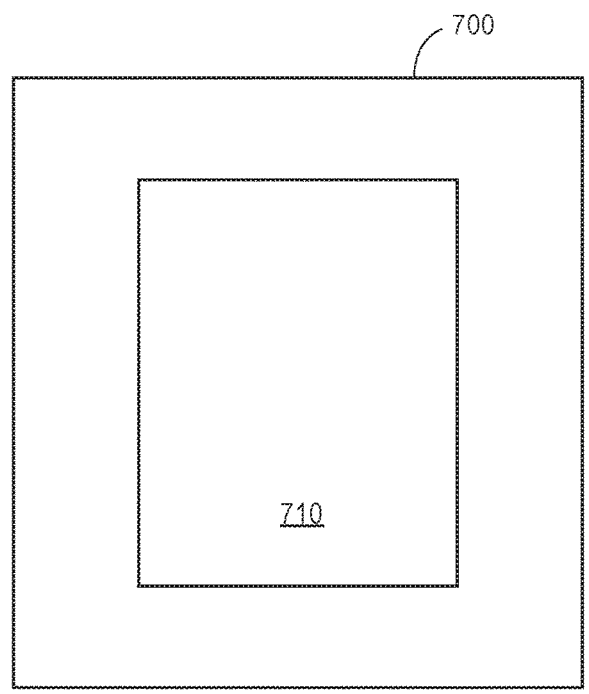
FIG. 7 shows a computer-readable memory containing instructions, according to an embodiment of the invention.

FIG. 7 shows a computer-readable memory containing instructions, according to an embodiment of the invention. Memory 710 may comprise one or more separate tangible storage mediums, which contain instructions that may be executed to perform operations described here. This medium may be contained within a larger system 700. Paragraph [0008] of this document contains further details on this medium.

EXAMPLES

The following examples pertain to particular embodiments:

Example 1 includes a wireless communications device comprising a processor and a memory, the device adapted to: communicate a physical layer protocol data unit (PPDU) on at least one WiFi channel in a 5 GHz band or a 2.4 GHz band, wherein the PPDU is to include an HE-SIG-A field, an L-SIG field, and an RL-SIG field; wherein the PPDU is to indicate a presence of at least one new band (NB) channel in a 3.5 GHz band; and wherein the PPDU is to indicate said presence with either the HE-SIG-A field, or with a combination of the L-SIG field and the RL-SIG field.

Example 2 includes the device of example 1, wherein the HE-SIG-A field is to have a bit to indicate the presence of the at least one NB channel.

Example 3 includes the device of example 1, wherein relative polarities of constellations in the L-SIG and RL-SIG fields are to indicate the presence of the at least one NB channel.

Example 4 includes the device of example 1, wherein the PPDU is to have at least one bit to indicate at least one frequency of the at least one NB channels.

Example 5 includes the device of example 1, wherein: the PPDU is to have an HE-SIG-B field for multi-user communications; and the PPDU is to indicate at least one frequency of the at least one NB channels for each of the multiple users.

Example 6 includes the device of example 1, wherein the wireless communications device is to transmit the PPDU.

Example 7 includes the device of example 1, wherein the wireless communications device is to receive the PPDU.

Example 8 includes the device of example 1, wherein the device comprises a display.

Example 9 includes a method of communicating in a wireless network, comprising: communicating, by a wireless communications device, a physical layer protocol data unit (PPDU) on at least one WiFi channel in a 5 GHz band or a 2.4 GHz band, wherein the PPDU is to include an HE-SIG-A field, an L-SIG field, and an RL-SIG field; wherein the PPDU indicates a presence of at least one new band (NB) channel in a 3.5 GHz band; wherein the PPDU indicates said presence with either an HE-SIG-A field, or with a combination of an L-SIG field and an RL-SIG field.

Example 10 includes the method of example 9, wherein the HE-SIG-A field has a bit to indicate the presence of the at least one NB channel.

Example 11 includes the method of example 9, wherein relative polarities of constellations in the L-SIG and RL-SIG fields indicate the presence of the at least one NB channel.

Example 12 includes the method of example 9, wherein the HE-SIG-A field has at least one bit to indicate at least one frequency of the at least one NB channels.

Example 13 includes the method of example 9, wherein the PPDU has an HE-SIG-B field for multi-user communications, and the HE-SIG-B field indicates at least one frequency for each of the multiple users.

Example 14 includes the method of example 9, wherein said communicating comprises transmitting.

Example 15 includes the method of example 9, wherein said communicating comprises receiving.

Example 16 includes a computer-readable non-transitory storage medium that contains instructions, which when executed by one or more processors result in performing operations comprising: communicating a physical layer protocol data unit (PPDU) on at least one WiFi channel in a 5

GHz band or a 2.4 GHz band, wherein the PPDU is to include an HE-SIG-A field, an L-SIG field, and an RL-SIG field; wherein the PPDU indicates a presence of at least one new band (NB) channel in a 3.5 GHz band; wherein the PPDU indicates said presence with either an HE-SIG-A field, or with a combination of an L-SIG field and an RL-SIG field.

Example 17 includes the medium of example 16, wherein the HE-SIG-A field has a bit to indicate the presence of the at least one NB channel.

Example 18 includes the medium of example 16, wherein relative polarities of constellations in the L-SIG and RL-SIG fields indicate the presence of the at least one NB channel.

Example 19 includes the medium of example 16, wherein the HE-SIG-A field has at least one bit to indicate at least one frequency of the at least one NB channels.

Example 20 includes the medium of example 16, wherein the PPDU has an HE-SIG-B field for multi-user communications, and the HE-SIG-B field indicates at least one frequency for each of the multiple users.

Example 21 includes the medium of example 16, wherein the operation of communicating comprises receiving.

Example 22 includes the medium of example 16, wherein the operation of communicating comprises transmitting.

Example 23 includes a wireless communications device comprising means to: communicate a physical layer protocol data unit (PPDU) on at least one WiFi channel in a 5 GHz band or a 2.4 GHz band, wherein the PPDU is to include an HE-SIG-A field, an L-SIG field, and an RL-SIG field; wherein the PPDU is to indicate a presence of at least one new band (NB) channel in a 3.5 GHz band; and wherein the PPDU is to indicate said presence with either the HE-SIG-A field, or with a combination of the L-SIG field and the RL-SIG field.

Example 24 includes the device of example 23, wherein the HE-SIG-A field is to have a bit to indicate the presence of the at least one NB channel.

Example 25 includes the device of example 23, wherein relative polarities of constellations in the L-SIG and RL-SIG fields are to indicate the presence of the at least one NB channel.

Example 26 includes the device of example 23, wherein the PPDU is to have at least one bit to indicate at least one frequency of the at least one NB channels.

Example 27 includes the device of example 23, wherein: the PPDU is to have an HE-SIG-B field for multi-user communications; and the PPDU is to indicate at least one frequency of the at least one NB channels for each of the multiple users.

Example 28 includes the device of example 23, wherein the wireless communications device is to include means to transmit the PPDU.

Example 29 includes the device of example 23, wherein the wireless communications device is to includes means to receive the PPDU.

Example 30 includes the device of example 23, wherein the device comprises a display means.

The foregoing description is intended to be illustrative and not limiting. Variations will occur to those of skill in the art. Those variations are intended to be included in the various embodiments of the invention, which are limited only by the scope of the following claims.

What is claimed is:

1. A wireless communications device comprising a processor and a memory, the device adapted to:
communicate a physical layer protocol data unit (PPDU) on at least one WiFi channel in a 5 GHz band or a 2.4 GHz band, wherein the PPDU is to include an HE-SIG-A field, an L-SIG field, and an RL-SIG field;
wherein the PPDU is to indicate a presence of at least one new band (NB) channel in a 3.5 GHz band; and
wherein the PPDU is to indicate said presence with either the HE-SIG-A field, or with a combination of the L-SIG field and the RL-SIG field.

2. The device of claim 1, wherein the HE-SIG-A field is to have a bit to indicate the presence of the at least one NB channel.

3. The device of claim 1, wherein relative polarities of constellations in the L-SIG and RL-SIG fields are to indicate the presence of the at least one NB channel.

4. The device of claim 1, wherein the PPDU is to have at least one bit to indicate at least one frequency of the at least one NB channels.

5. The device of claim 1, wherein:
the PPDU is to have an HE-SIG-B field for multi-user communications; and
the PPDU is to indicate at least one frequency of the at least one NB channels for each of the multiple users.

6. The device of claim 1, wherein the wireless communications device is to transmit the PPDU.

7. The device of claim 1, wherein the wireless communications device is to receive the PPDU.

8. The device of claim 1, wherein the device comprises a display.

9. A method of communicating in a wireless network, comprising:
communicating, by a wireless communications device, a physical layer protocol data unit (PPDU) on at least one WiFi channel in a 5 GHz band or a 2.4 GHz band, wherein the PPDU is to include an HE-SIG-A field, an L-SIG field, and an RL-SIG field;
wherein the PPDU indicates a presence of at least one new band (NB) channel in a 3.5 GHz band;
wherein the PPDU indicates said presence with either an HE-SIG-A field, or with a combination of an L-SIG field and an RL-SIG field.

10. The method of claim 9, wherein the HE-SIG-A field has a bit to indicate the presence of the at least one NB channel.

11. The method of claim 9, wherein relative polarities of constellations in the L-SIG and RL-SIG fields indicate the presence of the at least one NB channel.

12. The method of claim 9, wherein the HE-SIG-A field has at least one bit to indicate at least one frequency of the at least one NB channels.

13. The method of claim 9, wherein the PPDU has an HE-SIG-B field for multi-user communications, and the HE-SIG-B field indicates at least one frequency for each of the multiple users.

14. The method of claim 9, wherein said communicating comprises transmitting.

15. The method of claim 9, wherein said communicating comprises receiving.

16. A computer-readable non-transitory storage medium that contains instructions, which when executed by one or more processors result in performing operations comprising:
communicating a physical layer protocol data unit (PPDU) on at least one WiFi channel in a 5 GHz band or a 2.4 GHz band, wherein the PPDU is to include an HE-SIG-A field, an L-SIG field, and an RL-SIG field;
wherein the PPDU indicates a presence of at least one new band (NB) channel in a 3.5 GHz band;

wherein the PPDU indicates said presence with either an HE-SIG-A field, or with a combination of an L-SIG field and an RL-SIG field.

17. The medium of claim 16, wherein the HE-SIG-A field has a bit to indicate the presence of the at least one NB channel.

18. The medium of claim 16, wherein relative polarities of constellations in the L-SIG and RL-SIG fields indicate the presence of the at least one NB channel.

19. The medium of claim 16, wherein the HE-SIG-A field has at least one bit to indicate at least one frequency of the at least one NB channels.

20. The medium of claim 16, wherein the PPDU has an HE-SIG-B field for multi-user communications, and the HE-SIG-B field indicates at least one frequency for each of the multiple users.

21. The medium of claim 16, wherein the operation of communicating comprises receiving.

22. The medium of claim 16, wherein the operation of communicating comprises transmitting.

\* \* \* \* \*

UNITED STATES PATENT AND TRADEMARK OFFICE
CERTIFICATE OF CORRECTION

PATENT NO. : 10,231,214 B2
APPLICATION NO. : 15/472920
DATED : March 12, 2019
INVENTOR(S) : Xiaogang Chen et al.

Page 1 of 1

It is certified that error appears in the above-identified patent and that said Letters Patent is hereby corrected as shown below:

On the Title Page

In item (73), Assignee, Column 1, Line 1, delete "Corportion" and insert -- Corporation --, therefor.

Signed and Sealed this
Twenty-eighth Day of May, 2019

Andrei Iancu
*Director of the United States Patent and Trademark Office*